United States Patent
Moore et al.

(10) Patent No.: US 7,886,985 B2
(45) Date of Patent: Feb. 15, 2011

(54) DOMESTIC HEAT AND POWER SYSTEM

(75) Inventors: Nigel Graham Moore, Reading (GB); Heather Allderidge, Derbyshire (GB); Frank Ferdinandi, Cambridge (GB); Christopher John Spenceley, Yattendon (GB); Adrian Robin Richardson, Siichester (GB); Wayne Kenneth Aldridge, Nottingham (GB); David Anthony Clark, Huntingdon (GB); Alan William McCarthy-Wyper, Longlot (GB)

(73) Assignee: Microgen Engine Corporation Holding B.V., Ulft (NL)

( * ) Notice: Subject to any disclaimer, the term of this patent is extended or adjusted under 35 U.S.C. 154(b) by 1143 days.

(21) Appl. No.: 10/579,123

(22) PCT Filed: Nov. 15, 2004

(86) PCT No.: PCT/GB2004/004835
§ 371 (c)(1),
(2), (4) Date: Oct. 16, 2006

(87) PCT Pub. No.: WO2005/050100
PCT Pub. Date: Jun. 2, 2005

(65) Prior Publication Data
US 2007/0084942 A1 Apr. 19, 2007

(30) Foreign Application Priority Data
Nov. 14, 2003 (GB) ................................. 0326627.7

(51) Int. Cl.
*G05D 23/00* (2006.01)
(52) U.S. Cl. ..................................... 236/46 C; 700/286
(58) Field of Classification Search .............. 236/46 C, 236/46 R; 700/276, 286, 288; 237/19
See application file for complete search history.

(56) References Cited

U.S. PATENT DOCUMENTS 3,545,676 A    12/1970  Barker .......................... 236/75

(Continued)

FOREIGN PATENT DOCUMENTS

CH            682 345         8/1993

(Continued)

OTHER PUBLICATIONS

Sweet, W., "Networking assets distributed generation," IEEE Spectrum, vol. 38, No. 1, pp. 84-86, 88, XP002245189, Jan. 2001.

*Primary Examiner*—Marc E Norman
(74) *Attorney, Agent, or Firm*—Ballard Spahr LLP (57) ABSTRACT

This invention relates to domestic heat and power systems that allow efficient methods of operating a domestic combined heat and power (dchp) unit and to energy-efficient methods of scheduling domestic appliance operation within a household having a dchp unit. Dchp units provide heating and hot water for the home and also generate electricity for use in the home. A domestic heat and power system is provided that comprises a dchp unit, a dchp unit controller, a programmer module and an energy scheduler linked to allow communication therebetween, wherein the programmer module receives data input and generates a heating and/or hot water schedule therefrom, the dchp unit controller determines operating times of the dchp unit in accordance with the schedule and provides the operating times to the energy scheduler that then operates the domestic appliance during operating times.

33 Claims, 8 Drawing Sheets

U.S. PATENT DOCUMENTS

| | | | |
|---|---|---|---|
| 4,231,222 A | 11/1980 | Fenton | 60/524 |
| 4,335,847 A | 6/1982 | Levine | 236/46 |
| 4,620,668 A | 11/1986 | Adams | 236/46 |
| 5,115,967 A | 5/1992 | Wedekind | 236/46 |
| 5,248,083 A | 9/1993 | Adams et al. | 236/11 |
| 5,555,927 A | 9/1996 | Shah | 165/239 |
| 6,536,207 B1 | 3/2003 | Kamen et al. | 60/39.6 |
| 6,988,024 B2 * | 1/2006 | Funakura et al. | 700/288 |
| 2002/0182462 A1 | 12/2002 | Ballantine et al. | 429/23 |
| 2003/0029169 A1 | 2/2003 | Hanna et al. | 60/651 |
| 2004/0083732 A1 | 5/2004 | Hanna et al. | 60/651 |
| 2006/0065750 A1 * | 3/2006 | Fairless | 236/46 R |

FOREIGN PATENT DOCUMENTS

| | | |
|---|---|---|
| DE | 37 03 000 | 8/1988 |
| DE | 101 11 072 | 10/2002 |
| EP | 0 444 308 | 9/1991 |
| EP | 0 457 399 | 1/1996 |
| FR | 2 369 513 | 5/1978 |
| FR | 2 755 262 | 4/1998 |
| WO | WO 01/61820 | 8/2001 |
| WO | WO 01/65100 | 9/2001 |
| WO | WO 03/084023 | 10/2003 |

* cited by examiner

← RANGE OF FLOW TEMPERATURES →

| | chsp − δeng_neg | chsp | chsp + δsup_pos | chsp + δeng_pos | max temp |
|---|---|---|---|---|---|
| ENGINE BURNER | engine head temperature controlled at 550°C if on; else switches on if allowed | engine head temperature controlled at 550°C if on; else remains off | engine head temperature controlled at 550°C if on; else remains off | engine head temperature controlled at 550°C if on; else remains off | engine head temperature modulates from 550°C down to 250°C linearly unless peak or iron temperature exceed limits | off |
| SUPPLEMENTARY BURNER | modulates to maintain chsp if on; else fires 4 minutes after supplementary burner last switched off or 4 minutes after head temperature stabilises | modulates to maintain chsp if on; else fires 8 minutes after supplementary burner last switched off or 8 minutes after head temperature stabilises | modulates to maintain chsp if on; else remains off | off | off | off |

DOMESTIC HEAT AND POWER SYSTEM

CROSS REFERENCE TO RELATED APPLICATIONS

The present application claims priority to Great Britain Patent Application No. 0326627.7, filed 14 Nov., 2003, which application is incorporated herein fully by this reference.

INTRODUCTION

This invention relates to domestic heat and power systems that allow efficient methods of operating a domestic combined heat and power (dchp) unit and to energy-efficient methods of scheduling domestic appliance operation within a household having a dchp unit.

The use of dchp units for providing hot water and central heating in a domestic environment is known. For example, our International Patent Application No. PCT/GB03/001200 describes such a dchp unit that comprises a Stirling engine. These units are beneficial as, in addition to meeting a household's central heating and hot water requirements, they can also be used to generate electricity in an energy-efficient manner. The electricity so generated can be used either within the household when there is a demand for electricity or it may be sold back into the electrical grid supplying the household. Hence, the net amount of electricity drawn from the grid can be reduced. A further advantage of dchp units is that they can be used to supply electricity within a household in the event of a power cut.

Therefore, dchp units are inherently more energy efficient than traditional heating units employed in the home, such as boilers that provide hot water and/or central heating. That said, there will always be a drive towards ever increasing efficiencies in energy supply and use within the home. This accompanies a desire for flexibility and comfort among consumers.

The present invention addresses the issue of energy management by providing improved domestic heat and power systems that allow improved methods of scheduling electricity use within a home.

SUMMARY OF THE INVENTION

Against this background, and from a first aspect, the present invention resides in a domestic heat and power system comprising a dchp unit, a dchp unit controller, a programmer module and an energy scheduler arranged to communicate with a domestic appliance. The dchp unit controller, the programmer module and the energy scheduler are linked to allow communication therebetween. This allows the dchp unit to be operable under command of the dchp unit controller to generate heat for heating a home and/or to provide hot water for the home and to generate electricity for supply to the home. The energy scheduler is operable to receive power requirement information from the domestic appliance and to cause the domestic appliance to operate. The programmer module is operable to receive data input by a consumer and to generate a corresponding heating and/or hot water schedule therefrom. In turn, the dchp unit controller is operable to determine operating times of the dchp unit in accordance with the heating and/or hot water schedule provided by the programmer module and to provide the dchp unit operating times to the energy scheduler. The energy scheduler is then operable to determine operating times of the domestic appliance using these dchp unit operating times.

In this way, operation of the domestic appliance can be optimised such that the appliance is operated coincidently with operation of the dchp unit. Thus, electricity produced by operation of the dchp unit can be used to power the domestic appliance. Obviously, more than one domestic appliance may co-operate with the energy scheduler. This allows a reduction in electricity drawn from the grid, when so connected.

The dchp unit controller, the programmer module and energy scheduler may be arranged in different ways. They may correspond to separate physical entities situated in different locations. Alternatively, although separate entities, two or three of the dchp unit controller, programmer module and energy scheduler may be situated at a common location. Moreover, two or three of the dchp unit controller, programmer module and energy scheduler may not be physically separate. For example, the dchp unit controller and programmer module may be different functional parts of a common device such as a circuit board or a computer. The first example of a circuit board corresponds to an electronic implementation, whereas the second example of a computer corresponds to a software implementation. In fact, integration of the dchp unit controller, programmer module and energy scheduler (or any combination thereof) may be such that physical separation is impossible: they may merely correspond to a purely functional division of a common device or even a single block of computer program code.

Optionally, the domestic heat and power system further comprises a connection to an electrical grid adapted to supply electricity generated by the dchp unit to the grid. This allows power to be exported to the grid where more power is generated than is consumed by the domestic appliance or domestic appliances.

Preferably, the programmer module is operable to display information relating to the domestic heat and power system. This information is most likely to relate to the operation of the domestic heat and power system, such as the heating or hot water schedules, the operating schedules of domestic appliances, dchp unit operating conditions and servicing information. Other examples are provided in the following description of preferred embodiments of the present invention. Whilst some information may be displayed continuously (such as the current temperature of the home), most of the information available is preferentially displayed at the request of the consumer. In this way, the consumer or a service engineer can select the information they wish to see. This may be facilitated by the programmer module having a menu-driven graphical user interface that allows the consumer to navigate their way to the desired information through hierarchical menus presented by the programmer module.

Optionally, the domestic heat and power system further comprises communication means operable to communicate with remote locations. The remote locations are most likely to be those of service or product providers, such as a fuel supplier for the dchp unit or an electricity supplier. In addition the programmer module may be operable to send information about the heat and power system to a maintenance agent via the communication means. The communication means preferably comprises a modem operable to communicate via a telephone network, although other links such as mobile networks, radio links and satellite links may be used.

Preferably, the domestic heat and power system further comprises a first thermostat unit linked to allow communication to the programmer module. Conveniently, the thermostat unit is operable to measure the temperature and to display the temperature so measured, and further comprises adjustment means that allow a consumer to set a temperature of the home.

The adjustment means may be a rotary dial or the like and, optionally, the thermostat module may display both the current home temperature and a home temperature set by the consumer.

One or more secondary thermostat units may be used that are in communication with the first thermostat unit. This is partially beneficial in large homes or where the home is spread over several floors. Preferably, only the first thermostat unit is operable to measure the temperature and all thermostat units are operable to display the temperature so measured and further comprise adjustment means to allow the consumer to set a temperature of the home.

The present invention may also be used in a network of co-operating homes. Hence, according to a second aspect, the present invention resides in a domestic heat and power system serving a network of home comprising a hub controller, electricity transmission means connecting the network of homes, and communication means allowing communication between the network of homes and the hub controller. The domestic heat and power system further comprises at least one home provided with a dchp unit, a dchp unit controller and a programmer module wherein the dchp unit controller, the programmer module and the hub controller are linked to allow communication therebetween. The dchp unit is operable under command of the dchp unit controller to generate heat for heating that home and/or to provide hot water to that home and to generate electricity for use in that home and for supply into the network of homes via the electricity transmission means. The programmer module is operable to receive data input by a consumer and to generate a corresponding heating and/or hot water schedule therefrom. In turn, the dchp unit controller is operable to determine operating times of the dchp unit in accordance with the heating and/or hot water schedule provided by the programmer module. The dchp unit controller provides the dchp unit operating times to the hub controller.

The domestic heat and power system also comprises at least one other home provided with a local energy scheduler arranged to communicate with the hub controller and a domestic appliance in that home. The local energy scheduler is operable to receive power requirement information from the domestic appliance and to pass the information to the hub controller, wherein the hub controller is operable to determine operating times of the domestic appliance using the dchp unit operating times. The hub controller passes the domestic appliance operating times to the local energy scheduler that, in turn, causes the domestic appliance to operate in accordance with that schedule. Thus, the benefits of the present invention can be enjoyed over a network of homes where there is potential for even greater energy efficiency.

From a third aspect, the present invention resides in a domestic heat and power system comprising a dchp unit, a dchp unit controller and a programmer module. The dchp unit is operable under command of the dchp unit controller to generate heat for heating a home and/or providing hot water for the home and to generate electricity for supply to the home and/or to an electrical grid to which the home is connected. The programmer module is operable to receive data input by a consumer corresponding to time bands having start and end times, a desired temperature for the home during that time band and/or confirmation that hot water is required during that time band, and the programmer module is operable to generate a corresponding heating and/or hot water schedule therefrom. The dchp unit controller is operable to determine operating times of the dchp unit in accordance with the heating and/or hot water schedule provided by the programmer module such that the temperature of the home reaches the desired temperature and/or hot water is available at the start time of each time band.

This is in contrast to the standard operation of domestic heating and hot water systems that allow a consumer to set only time bands, each time band having a start time and an end time. The standard system only fires at the start time and switches off at the end time. Hence, hot water and/or heating is only available at some time after the start time entered by the consumer. As a result, the consumer must guess the required offset to be entered to ensure the home is warmed and/or hot water is available at a particular desired time.

Advantageously, the consumer may divide each day into any number of time bands and enter associated temperatures and/or hot water requirements. This will ensure that the home is kept at a minimum temperature throughout the day. It also allows for greater variety in home temperatures that can be achieved.

The dchp unit will often comprise a main burner and a supplementary burner, with operation of the main burner generating electricity, in which case the dchp unit controller preferably determines the dchp unit operating times according to a rule that firing of the supplementary burner should be minimised. In this way, firing of the main burner is maximised and, therefore, so is electricity generation (most current dchp units do not generate electricity from firing of the supplementary burner). Optionally, the dchp unit controller is operable to determine the dchp unit operating times such that there is a period where the main burner is fired alone prior to the start time of a time band for which an elevated desired temperature has been set. Although it will take longer to reach the desired temperature, the amount of electricity generated is maximised in this way.

In order to ensure the home will reach a desired temperature at the start of a time band, the dchp unit controller is preferably operable to receive information indicative of the temperature of the home and to predict whether the home will reach the desired temperature in time for the start of the time band and, where the prediction is in the negative, is operable to cause the supplementary burner to fire thereby ensuring that the home does reach the desired temperature in time for the start of the time band.

Various methods of ensuring that an optimum pre-heating period is used to achieve a desired temperature at a start time can be employed. Conveniently, the dchp unit controller may be operable to record the time taken to reach the desired temperature of a time band for a plurality of previous days and to determine the length of the period during which the main burner alone is to be fired using these times. In addition, the dchp unit controller may optionally be operable to increase automatically the length of a subsequent period during which the main burner alone is fired if the supplementary burner is fired to ensure the home reaches a desired temperature in advance of the start of the time band.

Optionally, when both heating and hot water are required in advance of the start of a time band, the dchp unit controller determines the dchp unit operating times according to a rule that the dchp unit operates for a first period to provide hot water immediately before a second period where the dchp unit operates to provide heating. Preferably, the dchp unit controller is operable to determine the dchp unit operating times such that the main burner remains firing between periods. In this way, the main burner may be left on throughout both periods to the benefit of efficiency.

Optionally, heating and/or hot water is maintained during a time band by the dchp unit under the command of the dchp unit controller, whereby the dchp controller is operable to determine operation of the dchp unit according to the rule that the supplementary burner is switched between firing and idling in preference to switching the main burner between firing and idling. This allows the main burner to be fired preferentially, thereby maximising electricity generation.

Advantageously, the dchp controller may be operable to control the firing rate of the supplementary burner and/or the main burner using a measure of the rate of change of the home temperature. Optionally, the domestic heat and power system further comprises a thermistor-based thermometer operable to supply to the dchp unit controller the measure of the rate of change of the home temperature.

Preferably, the temperature of the main burner head is monitored and, optionally, the dchp unit controller is operable to control the dchp unit to maintain a main burner head temperature of substantially 550° C. The dchp unit controller may be operable to maintain the main burner head temperature by varying the flow of combustible fuel through the main burner. In a currently preferred embodiment, the dchp unit controller may be arranged to switch the mains burner to idle if a main burner head temperature above an upper limit is measured. In addition the dchp unit controller may be arranged to reduce the temperature of the main burner head without setting the engine burner to idle when a main burner head temperature above a lower limit but below the upper limit is measured.

Advantageously, the programmer module is operable to receive data input by a consumer corresponding to at least two sets of time bands having start and end times, a desired temperature for the home during that time band and/or confirmation that hot water is required during that time band, each time band spanning a twenty four hour period and the consumer indicating which set is to be used for each day of the week and wherein the dchp unit controller implements the appropriate set on each day.

According to a further aspect, the present invention resides in a method of energy scheduling in a home comprising a dchp unit, a dchp unit controller, a domestic appliance and an energy scheduler, the method comprising the steps of: a consumer selecting hot water and/or heating requirements; the dchp unit controller scheduling operation of the dchp unit to generate a hot water and/or heating schedule from the requirements selected; and the energy scheduler scheduling operation of the domestic appliance to coincide with operation of the dchp unit.

According to a yet further aspect, the present invention resides in a method of providing heating and/or hot water to a home comprising a dchp unit, a dchp unit controller, a domestic appliance and an energy scheduler, the method comprising the steps of: a consumer selecting time bands having start and end times, a desired temperature for the home during that time band and/or confirmation that hot water is required during that time band; and the dchp unit controller scheduling operation of the dchp unit to generate a hot water and/or heating schedule in accordance with the heating and/or hot water requirements selected such that the temperature of the home reaches the selected temperature and/or hot water is available at the start time of each time band.

DESCRIPTION OF DRAWINGS

In order that the invention may be more readily understood, reference will now be made, by way of example only, to the accompanying drawings in which.

SPECIFIC DESCRIPTION

Figure 1:
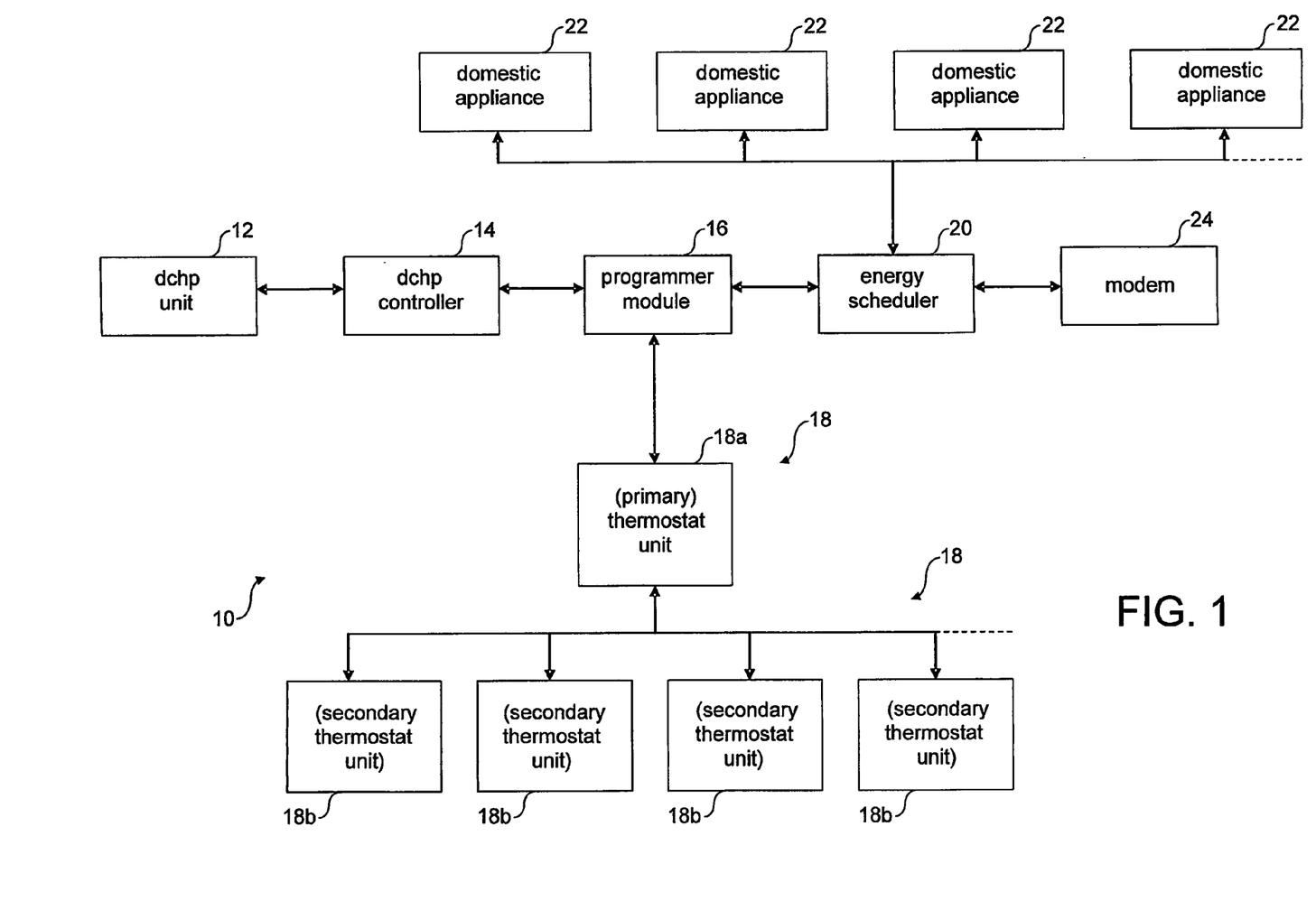
FIG. 1 is a block diagram of a domestic energy scheduling system.

A domestic energy scheduling system 10 is shown in FIG. 1 that includes a dchp unit 12, a dchp controller 14, a programmer module 16, thermostat units 18, an energy scheduler 20, domestic appliances 22 and a modem 24. The dchp unit 12 comprises burners for supplying heat and hot water to a home and a Stirling engine for producing electricity. The dchp controller 14 exercises direct control over the dchp unit 12 and conveys information relating to operation of the dchp unit 12, whilst the energy scheduler 20 fulfils a similar function with respect to the domestic appliances 22. Specifically, the energy scheduler 20 conveys information relating to electricity demand from connected domestic appliances 22 and operates the connected domestic appliances 22 in response to the schedule of electricity generation from the dchp unit 12. The programmer module 16 is linked to both dchp controller 14 and energy scheduler 20 and acts as a central interface for the consumer by displaying information relating to the energy scheduling system 10 and by accepting programming inputs from the consumer. In addition, temperatures may be set by the consumer using the thermostat modules 18.

The dchp controller 14 is located within the dchp unit 12 and communicates with the programmer module 16. The programmer module 16 conveys an operating schedule set by the consumer that corresponds to a number of time bands and temperatures to which the home should be heated during those time bands and also time bands when hot water should be available. The dchp controller 14 determines operating plans for the dchp unit 12 to meet these operating schedules. Alternatively, the programmer module 16 may determine the operating schedule for the dchp unit 12. In this case, the dchp controller 14 may correspond to means for converting the signals provided by the programmer module 16 into signals that are suitable for commanding the dchp unit 12 (i.e. effectively a communications manager).

The energy scheduler 20 is linked to selected domestic appliances 22, such as a washing machine, a tumble drier and a dishwasher. It is also linked to a modem 24 thereby allowing communication with service providers. The service providers may provide information like the cost of combustible gas supply and the cost and value of electricity imported from and exported to the grid. Using information received via the modem 24 in addition to the information held regarding electricity demand from the connected domestic appliances 22 and forecast electricity supply from the dchp unit 12, the energy scheduler 20 may schedule operation of connected domestic appliances 22.

Each element of the domestic energy scheduling system 10 will now be described in greater detail.

Dchp Unit

Figure 2:
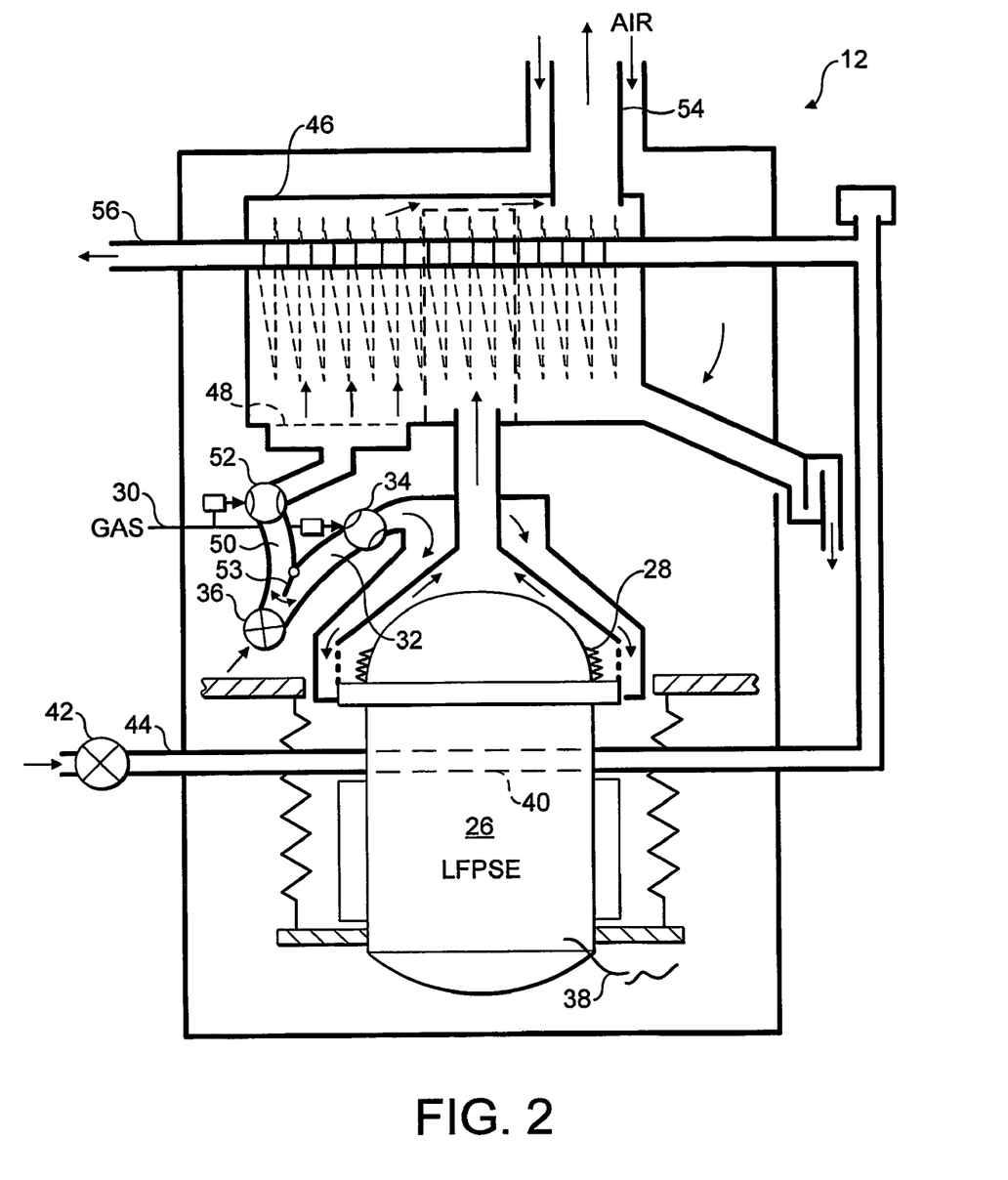
FIG. 2 is a simplified representation of a dchp unit.

A dchp unit 12 that may be used to heat a home and also to supply the home with hot water is shown in FIG. 2. In addition, the dchp unit 12 may be used to generate electricity that may be either consumed within the home or fed back into the electrical grid supplying the home.

The dchp unit 12 is based around a Stirling engine 26. The engine 26 is preferably a linear free-piston Stirling engine, the operation of which is well known in the art. For use in a dchp unit 12, the electrical output of the engine should be a single phase output of up to 16 Amps.

The Stirling engine 26 is driven by a heat output from an engine burner 28. This burner 28 is fuelled by a combustible gas supply 30 that is mixed with an air supply 32 under the control of a valve 34. The mixed stream is fed to the engine burner 28 by a fan 36. This drives the Stirling engine 26 to generate an electrical output 38 from a linear alternator. Heat is extracted from the Stirling engine at a cooler 40 that is essentially a heat exchanger through which water is pumped by pump 42 along line 44. The water passing through the cooler 40 is then further heated in a heat exchanger 46 by exhaust gases from the engine burner 28 that has heated the head of the Stirling engine 26.

In order to provide further heating of the water, and also to provide a degree of independence when the Stirling engine 26 is not being operated, a supplementary burner 48 is provided to heat the water in the heat exchanger 46. The supplementary burner 48 is fuelled by the combustible gas supply 30 which is mixed with an air supply 50 under the control of the valve 52. The mixed stream is fed to the supplementary burner 48 by the fan 36. The fan 36 feeds air to mixer valves 34 and 52 through a diverter valve 53 that ensures the correct air flow to each mixer. In an alternative design, separate fans have been used to feed air to the two gas/air mixer valves 34, 52. This removes the need for a diverter valve but it does carry significant weight, cost and efficiency penalties over the single fan design. As will be appreciated, operation of the supplementary burner does not generate electricity because it does not drive the Stirling engine 26.

Exhaust gases from the engine burner 28 and supplementary burner 48 that have given up their heat in the heat exchanger 46 exit along flue 54. In this manner, the Stirling engine 26 produces an electrical output 38 and a heat output 56, the latter of which may be used, for example, to provide a domestic hot water requirement, to feed a central heating system, or both of these in a combination arrangement ("combi" boiler).

The dchp unit 12 is designed to provide up to 4 kW of electricity (net) feeding directly into the domestic network and, hence, combining with the supply from the grid.

Dchp Controller

The dchp controller 14 is housed within the dchp unit 12 and an associated display is provided on the dchp unit 12 for displaying information on the current operation of the dchp unit 12, this information also being available to view at the programmer module 16. The dchp controller 14 has no means for direct data input: instead, it receives information from the programmer module 16.

The purpose of the dchp controller 14 in this embodiment is to automate operation of the dchp unit 12 so as to minimise operating costs whilst carrying out all necessary safety functions. The dchp controller 14 receives information from the programmer module 16 regarding the required temperature schedules for each 24 hour period. The dchp controller 14 converts these schedules into operating plans for the 24 hour periods that enables the engine burner 28 and the supplementary burner 48 of the dchp unit 12 to operate as economically as possible.

The dchp unit 12 will only operate if there is a demand for either central heating or hot water. When operating, the engine 26 will generate electricity and feed this into the domestic circuit combining with the supply from the electric grid. The dchp controller 14 informs the energy scheduler 20, via the programmer module 16, of the electricity generating schedule for the next 24 hours according to the operating plan it has devised.

Figure 6:
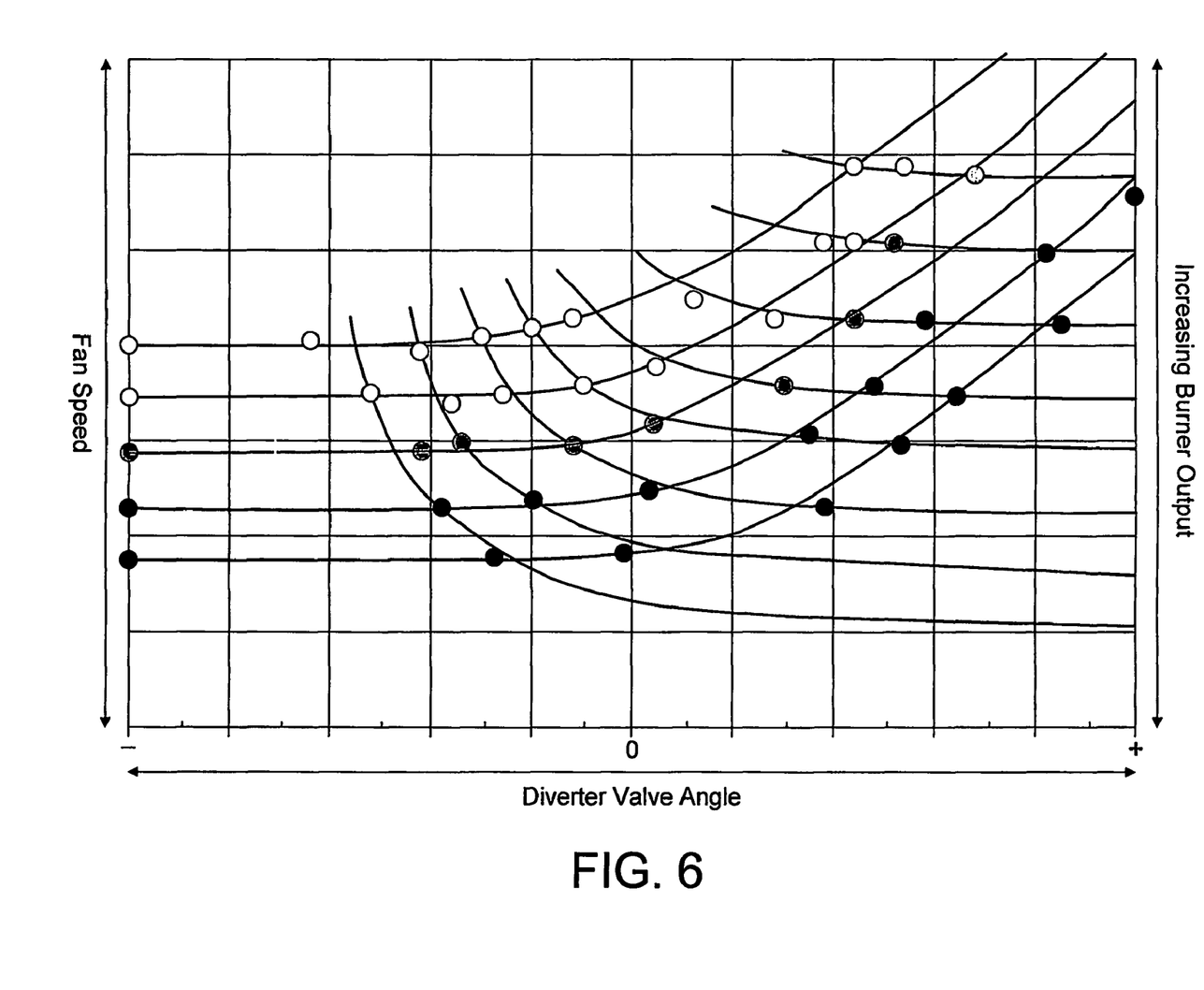
FIG. 6 shows a map relating burner output to fan speed and mixer valve angle.

The dchp controller 14 starts and stops both the engine burner 28 and supplementary burner 48 and modulates their operation in proportion to the heat demand using valves 34 and 52, and fan 36. Response to the heat demand is affected through control of the gas mass flow by adjusting the rate of mass flow through the engine burner 28 and supplementary burner 48. This rate is determined by an adaptive algorithm that takes account of thermal inertia in the primary water circuit and transport delay in the circuit, allowing it to calculate a heat demand and corresponding mass flow. These mass flows are converted to corresponding fan speeds and mixer valve angles according to a locally-stored map, such as the one shown in FIG. 6. Further details of this method of operation can be found in our co-pending patent application no. GB0305566.2. Depending upon the size of the heat demand, one or both burners 28 and 48 are operated.

The dchp controller 14 also manages connection and disconnection of the alternator to the grid. The dchp unit 12 is connected to the grid when a target engine head temperature is reached and is disconnected when the engine head temperature drops below a lower limit or when the electricity generated by the engine drops below a lower limit. Disconnection also occurs if the mains supply goes outside limits set for frequency and voltage.

Programmer Module

The programmer module 16 represents the primary interface with the consumer and, according to this embodiment, is physically separate from the dchp unit 12 although they may be located close to one another (e.g. both in a kitchen or utility room). Other arrangements are possible, as is described below.

The programmer module 16 comprises a display for displaying information and instructions to a consumer, and buttons and a dial to allow a consumer to enter information. The functionality of the buttons and dial are flexible and are operated in association with information presented on the display. The consumer uses the programmer module 16 to enter scheduling information. For example, functions that may be changed through the programmer module 16 include turning the heating on and off, selecting different heating schedules (e.g. "home" for a day when the consumer will be at home and "work" for a day when the consumer will be at work, or between "economy" and "rapid" modes), setting the date and time, and viewing statistical information. This statistical information may include: the amount of electricity produced to date; electricity currently being generated either absolutely or as a fraction or percentage of the current demand; a reset function for zeroing values (akin to a trip meter of a car's milometer); the date of the last reset so the total energy can be quantified; and the installation date and/or operating hours to allow comparison to warranty periods and service schedules.

In addition, the programmer module 16 acts as a hub exchanging information with the dchp controller 14, the energy scheduler 20 and thermostat units 18. In some currently contemplated embodiments, an energy scheduler 20 is not included in the energy scheduling system 10 in which case the programmer module 16 connects directly with a modem 24 thereby allowing diagnostic data to be sent to a service provider or maintenance centre.

The programmer module 16 may display errors and warnings when the energy scheduling system 10 is functioning incorrectly. Some errors may require the consumer to perform a reset of the dchp unit 12 or energy scheduling system 10 and this is performed using the programmer module 16.

Thermostat Units

Although temperature may be set at the programmer module 16, one or more thermostat units 18 are provided to allow temperature setting at other locations around the home. The thermostat units 18 comprise a display and a rotary dial: a consumer may set a temperature to which the home should be warmed by rotating the dial until the desired temperature is displayed. The number of thermostat units 18 provided is generally dependent upon the size of the home: additional thermostat units 18 are provided for convenience to avoid the need to move too far around the home in order to adjust the temperature setting. This may be particularly beneficial where the home extends over several floors or where the programmer module 16 is located in a little-used part of a home (e.g. in a utility room) in which case the thermostat units 18 may be located in frequently-used rooms such as a living room or bedroom, or in a main thoroughfare such as a hallway or landing.

Where multiple thermostat units 18 are installed, one unit will act as a master 18a and the other units will be secondary 18b. All thermostat units 18 can be used to set temperature but only the master unit 18a provides temperature readings. The thermostat units 18 are networked in a hierarchy such that the master unit 18a is connected to the programmer module 16 and the secondary units 18b are connected to the master unit 18a. In addition, the thermostat units 18 may show system error messages on their displays to ensure any faults are noticed by the consumer as quickly as possible.

Energy Scheduler

The energy scheduler 20 provides a link between the programmer module 16 and other electrical appliances 22 in the home that are to be operated via the energy scheduling system 10. For the sake of simplicity, the energy scheduler 20 has no direct interface with the consumer but instead communicates through the programmer module 16 such that the consumer has only a single interface. Hence, the programmer module 16 may present the overall home energy status and consumption forecast.

Information relating to the available electricity at any instant and the forecast available electricity for the next 24 hours (that follows from the operating plan of the dchp unit 12) is passed to the energy scheduler 20. The energy scheduler 20 can then determine the most economic way to use this electricity and to import additional electricity from the grid, where required, according to local scheduling algorithms stored in its memory.

Diagnostic data is sent from the dchp controller 14 to the energy scheduler 20 via the programmer module 16. These data are sent as part of a regular update to a service provider through the modem 24 to which the energy scheduler 20 is connected. In return, the same service provider or one or more other service providers send up-to-date tariff information (for electricity import/export and gas supply) to the energy scheduler 20 for use with the energy scheduling algorithm. Where online tariff information is not available, stored tariff data is used instead that may be updated periodically by the consumer. The benefits of the energy scheduling system 10 are thus accessible even when a service provider link (or the modem) is unavailable.

Domestic Appliances

In principle, any type of domestic appliance 22 may be connected to the energy scheduler 20. However, not all domestic appliances 22 are suitable for energy scheduling as they provide an on-demand service (e.g. a television). Appliances 22 such as washing machines, tumble driers and dishwashers may be operated with some flexibility as regards timing of their operation and so are eminently suitable for connection to the energy scheduler 20.

Modem

A standard modem 24 is used that allows the energy scheduler to communicate with remote computer servers located at a service provider, maintenance centre or other similar location through a data link such as a telephone line, radio link, broadband network or the like.

Consumer Programming

The majority of central heating/hot water controllers in the United Kingdom operate according to time bands set by a consumer to correspond to two "on" cycles during which time the home is heated to a temperature set using a thermostat. Heating of the home will only begin at the start of each "on" cycle so that there is a delay before the home reaches the set temperature. At the end of the "on" cycle, the heating switches off and the home cools back down to whatever the ambient temperature happens to be. This method of operation is not particularly convenient because most consumers require a set temperature to be achieved at a set time, e.g. when they get up in the morning or when they get home from work, and because there is no control over the temperature between "on" cycles. In addition, this method does not take account of outside conditions, which have a significant effect on heating times and achieved temperatures.

Figure 3:
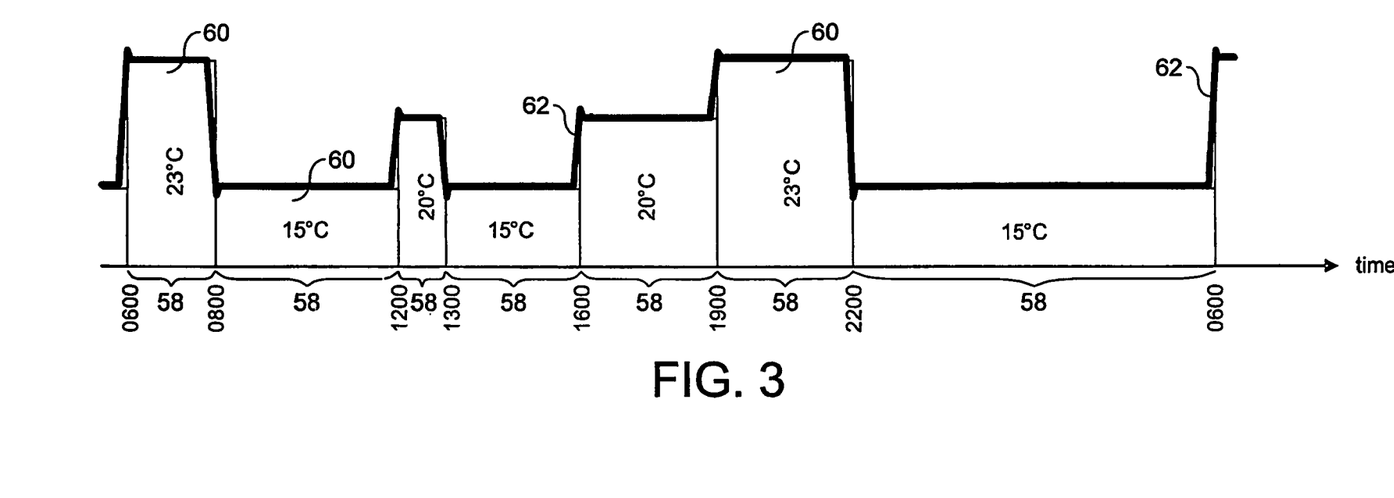
FIG. 3 shows heating schedule for a 24 hour period corresponding to a "work" day.
Figure 4:
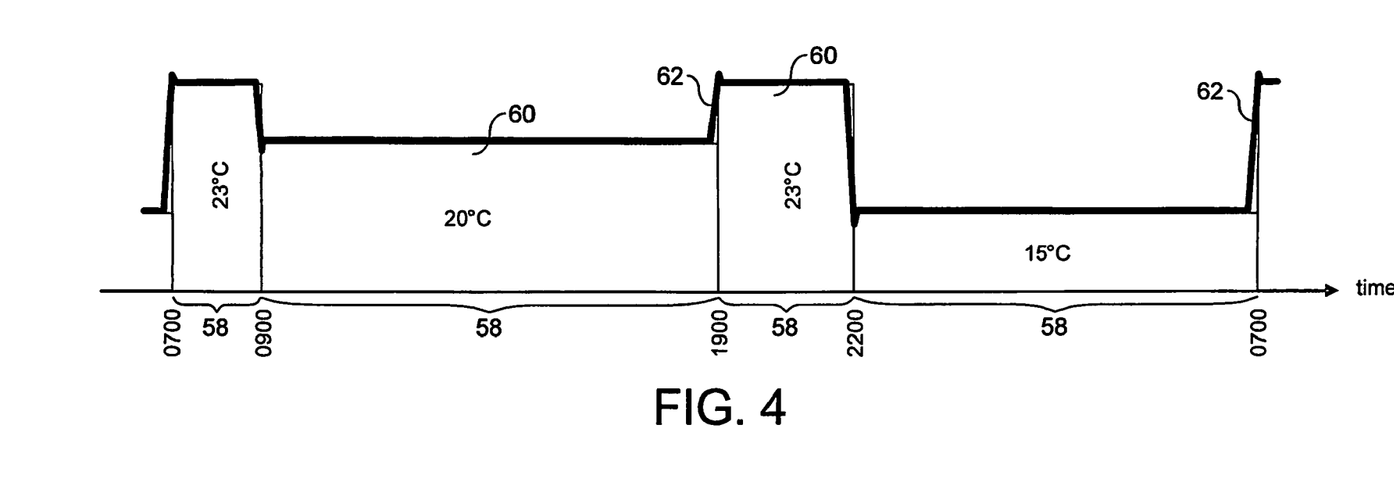
FIG. 4 shows a heating schedule for a 24 hour period corresponding to a "home" day.

This embodiment employs an alternative method of operation where a consumer divides the day into any number of time bands 58 and selects a temperature 60 for the home for each band 58. Accordingly, the temperature of the home is controlled at all times. An example is shown in FIGS. 3 and 4. FIG. 3 corresponds to a "work" day where the consumer will only be in the home during certain limited periods in the 24 hour period. A reduced temperature (15° C.) is set for the periods the home is empty and overnight, an intermediate temperature (20° C.) is set for lunchtime and early evening and an elevated temperature (23° C.) is set for the morning and late evening. FIG. 4 corresponds to a "home" day where the home if kept at an intermediate temperature (20° C.) throughout the day.

In addition, the start time of a band 58 set by the consumer is implemented as the time by which the band's temperature 60 should be reached. Accordingly, the heating system will start work in advance of a start time to ensure a higher selected temperature is reached by that start time or will switch off in advance of a start time to allow the home to cool to a lower selected temperature. This is indicated by the lines 62 of FIGS. 3 and 4 that indicate the temperature of the home.

The time when the heating is started or finished in order to meet a selected temperature at a selected time is calculated with respect to the inside air temperature, the outside air temperature, the heating power of the dchp unit 12, the size of the home and the quality of the insulation of the home. This information is used by the dchp controller 14 to determine the most economical way of heating the home to a higher selected temperature, as will be described in greater detail below.

In addition to the "work" and "home" programs described above, any number of other programs can be set to provide maximum comfort for the consumer. For example, a "holiday" program may be used that maintains the home at a reduced temperature. Hence, when a consumer leaves the home to go on holiday, the consumer may switch programs quickly and conveniently to a schedule that temporarily keeps the home at a desired minimum temperature to the benefit of house plants and other delicate items. This may be in addition to any frost protection, such as firing the supplementary burner when the water temperature within the dchp unit 12 falls below a threshold level (e.g. about 5° C.) to prevent water freezing. A temperature sensor located within the dchp unit 12 uses the assumption that the dchp unit 12 is the coldest point in the heating system. This is often the case as the dchp unit 12 is commonly located in a garage or utility room. However, the temperature sensor could be located remotely for cases where this assumption does not hold true (e.g. to be located in a loft).

Servicing

In addition to providing an interface for the consumer, the programmer module 16 also provides an interface for a service engineer visiting the home (either during maintenance or during installation of the system). In this way, more detailed information may be presented to a service engineer than would be available for a conventional heating appliance, such as:

- system information during installation and for updating
    - program/integrated circuit versions
    - error history, e.g. a log of the last ten error codes
    - geographical location for setting local language (English, French, German, etc), temperature format (° C., ° F.) and date format (31/12/03, 12/31/03)
- temperature readings
    - inside/outside air temperature
    - thermostat temperature
    - flow/return temperature
    - balance/engine head temperature
- dchp unit 12 configuration to allow the following adjustments
    - turning the engine 26 on/off
    - turning pre-heating on/off
    - resetting the supplementary pre-start time adjustment
    - adjusting the supplementary pre-start time Anti-Cycling Strategies When the dchp unit 12 is fully warmed up, it should be operated to maintain a steady temperature in the home whilst ensuring the firing rate of the engine burner 28 is kept to a minimum. This is achieved by modulating when the supplementary burner 48 fires. This modulation has the effect of keeping temperatures within the heat exchanger 46 as low as possible for any required heat demand, thereby maximising the condensing efficiency. This increases the average efficiency of heating due to reduced water temperatures within the final stage of the dchp unit circuit and so is beneficial economically.

Further strategies may be used during normal operation in order to minimise on/off cycling of the engine 26. These are aimed at mitigating the effect of fluctuations in the system load that result in demands less than the engine burner output at some times and demands greater than the engine burner output at other times. Unless pre-emptive action is taken, this will lead to inefficient cycling of one or both burners 28 and 48. Frequent cycling of burners 28 and 48 will significantly reduce their lifetimes in addition to being inefficient.

Figure 5:
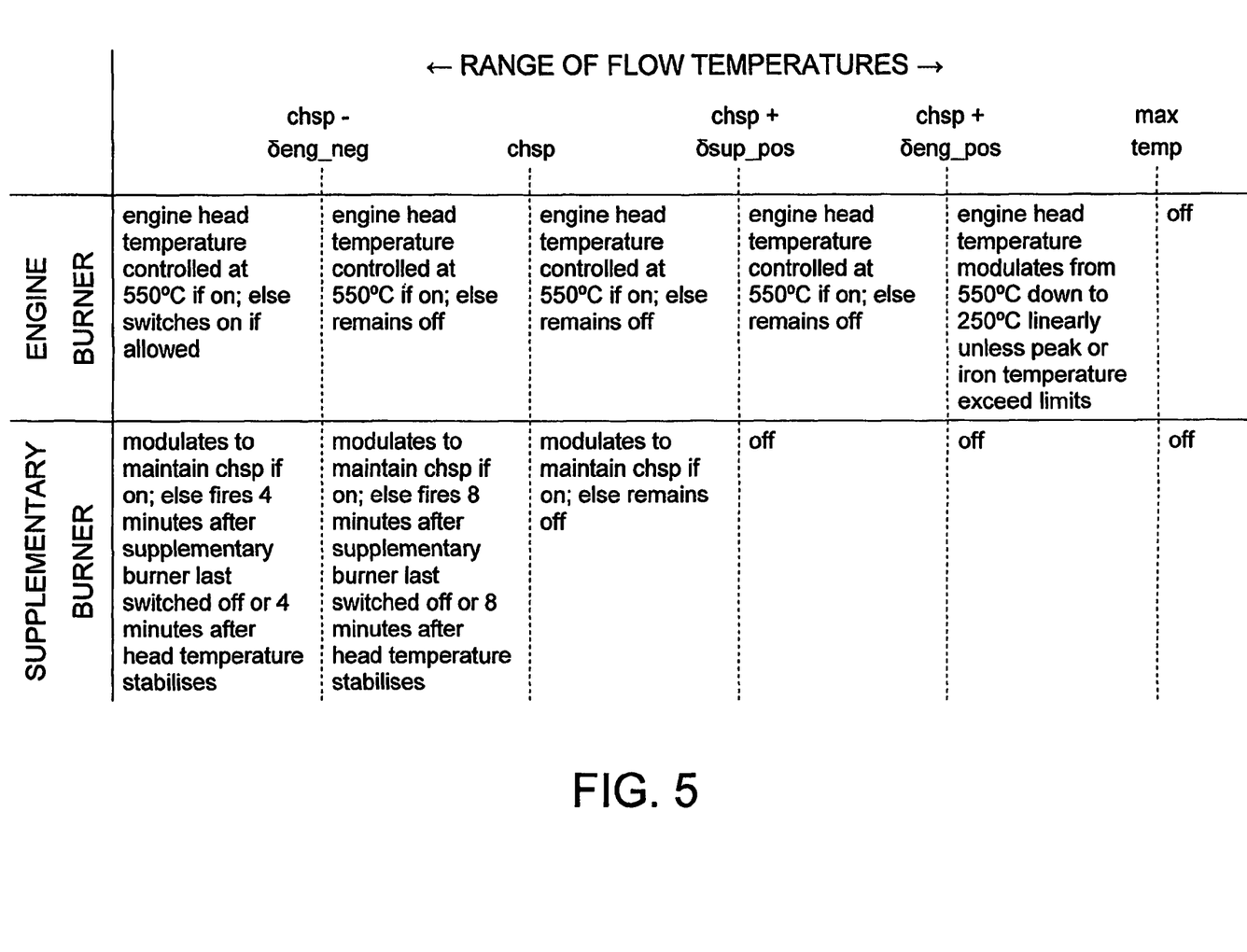
FIG. 5 is a table showing how the engine burner and supplementary burner are operated at temperatures around the central heating set point (chsp)

Guard bands have been set around the flow temperature set point to define regions corresponding to how the engine burner 28 and supplementary burner 48 are used. These are shown in FIG. 5.

When a heat demand signal appears, the engine 26 is started. When the engine head temperature reads 500° C., a timer is started. If, after eight minutes, the flow temperature is below chsp-$\delta$eng_neg, the supplementary burner 48 will be fired (where chsp is the central heating set point temperature and $\delta$eng_neg is set to be 5° C. in this embodiment). When the flow temperature falls below chsp-$\delta$eng_neg again, the timers are restarted and the supplementary burner 48 is controlled as described above and as shown in FIG. 5. In FIG. 5, $\delta$sup_pos is set to be 5° C. in this embodiment and $\delta$eng_pos is set to be 10° C.

Hence control of the supplementary burner 48 is based on the temperature of the engine head, as measured by a k-type thermocouple. For safety reasons, the maximum heater head temperature ("max temp" in FIG. 5) is defined to be 600° C.: if this temperature is exceeded, the engine burner 28 is shut down and the engine 26 is stopped by stalling the alternator. Operation of the engine burner 28 is also modulated with respect to peak and iron temperatures. The peak temperature is the highest temperature in the appliance cooling circuit and should not exceed 85° C. The iron temperature is the temperature of magnets within the alternator and should not exceed an upper limit to avoid loss of magnet strength and/or magnet life.

System Warm-Up

As described previously, the domestic energy scheduling system 10 is programmed by a consumer so that the dchp unit 12 is operated to ensure the home reaches a set temperature by a set time. Often a consumer will ask for hot water to be available at the same time that this heating of the home is required. Exactly how the dchp unit 12 operates to heat the home and supply hot water is determined by the dchp controller 14.

Figure 7:
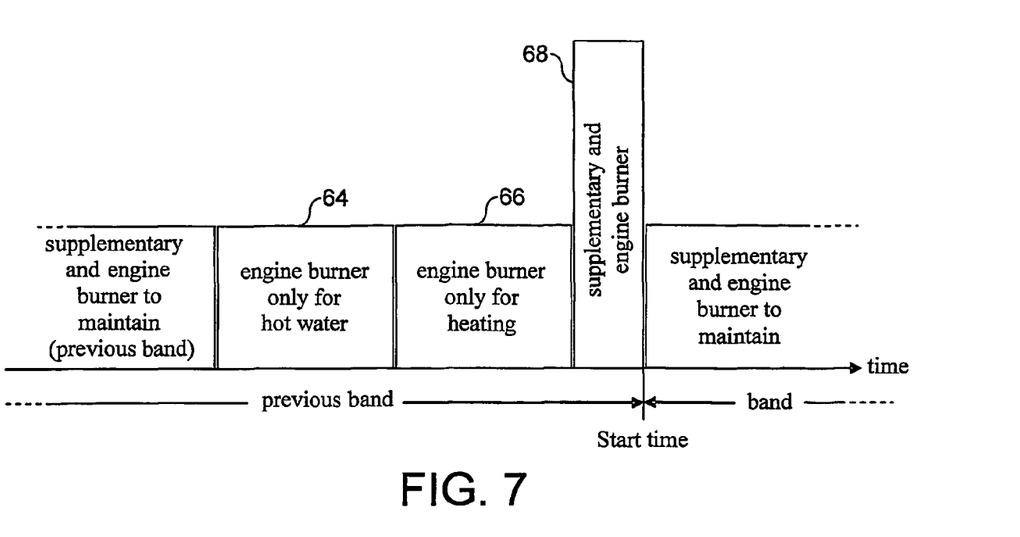
FIG. 7 shows the relative timings of a start-up sequence of the dchp unit of FIG. 1.

It has been found to be more efficient overall for the dchp unit 12 to have initial pre-heat periods 64 and 66 prior to a brief period at 68 of firing both engine burner 28 and supplementary burner 48 together (if required), rather than to try and deliver hot water and the central-heating set temperature in the quickest possible time.

Where losses from the fabric of the home are low (as is the case for most modern homes), it is beneficial to use the dchp unit 12 to meet a heating requirement by bringing the home up to temperature using the engine burner 28 alone.

In this way, the supplementary burner 48 is used only during the pre-heat periods 64 and 66 where the heat load is greater than can be supplied from the engine burner 28 alone. The pre-heat periods 64 and 66 are used only for periods where the benefit of the electricity produced by the dchp unit 12 outweighs the cost of heat losses through the fabric of the home. For example, the energy scheduler 20 may have indicated that a washing machine is set to operate and so the washing machine can be operated during the hot water pre-heat 64 and the central heating pre-heat 66, using the electricity produced by the dchp unit 12.

Taking $Q_{max}$ as the threshold heat loss from the home, above which it is not economic to utilise the central heating pre-heat 66, $Q_{max}$ can be determined by the ratio of electricity and gas prices (as supplied via the modem 24) and the estimated electricity demand in the home (as conveyed by the energy scheduler 20). Heat loss from the home is a function of the heat transfer coefficient of the external walls (U, the U-value as per building specifications), the total surface area of the walls (A), and the internal and external air temperatures ($T_{in}$, $T_{out}$) so that $$U \times A \times (T_{in} - T_{out}) < Q_{max}$$

for operation of the central heating preheat 66 to be economical. The product U×A can be determined by the dchp controller 14 by learning the historic response of $T_{in}$ to a variety of heat inputs for a variety of external temperatures $T_{out}$.

$T_{in}$ and $T_{out}$ may be measured through sensors that supply readings to the dchp controller 14. $T_{in}$ can be determined from the master thermostat unit 18a and conveyed to the dchp controller via the programmer module 16. $T_{out}$ may be determined from a thermostat (not shown) at or near the combustion air inlet of the dchp unit, but it is preferable from an economic basis to use a temperature sensor located in the inlet air stream internal to the appliance (e.g. a pack temperature sensor). When the dchp unit 12 is not operating, it is necessary to operate the air intake fan for short periods of time to allow the external temperature $T_{out}$ to be sampled.

Where high fabric losses from the home indicate that it is not economical for engine burner pre-heat periods 64 and 66 to be used (i.e. where the house will lose heat at the same rate or a greater rate than the heat is supplied) or where there is no benefit from the power generated during the pre-heat period, the dchp unit is operated with a preset pre-heat period to ensure hot water and/or the central heating set point temperature are met on or before the set time. This period will be, for example, 30 minutes where central heating alone is required or 60 minutes where both central heating and hot water are required.

FIG. 7 shows how the dchp unit 12 is operated to supply hot water and to heat the home by a set time. Initially at 64, the engine burner 28 is fired to provide hot water ahead of the set time. Next, at 66, the engine burner 28 is used to provide central heating ahead of schedule.

Figure 8:
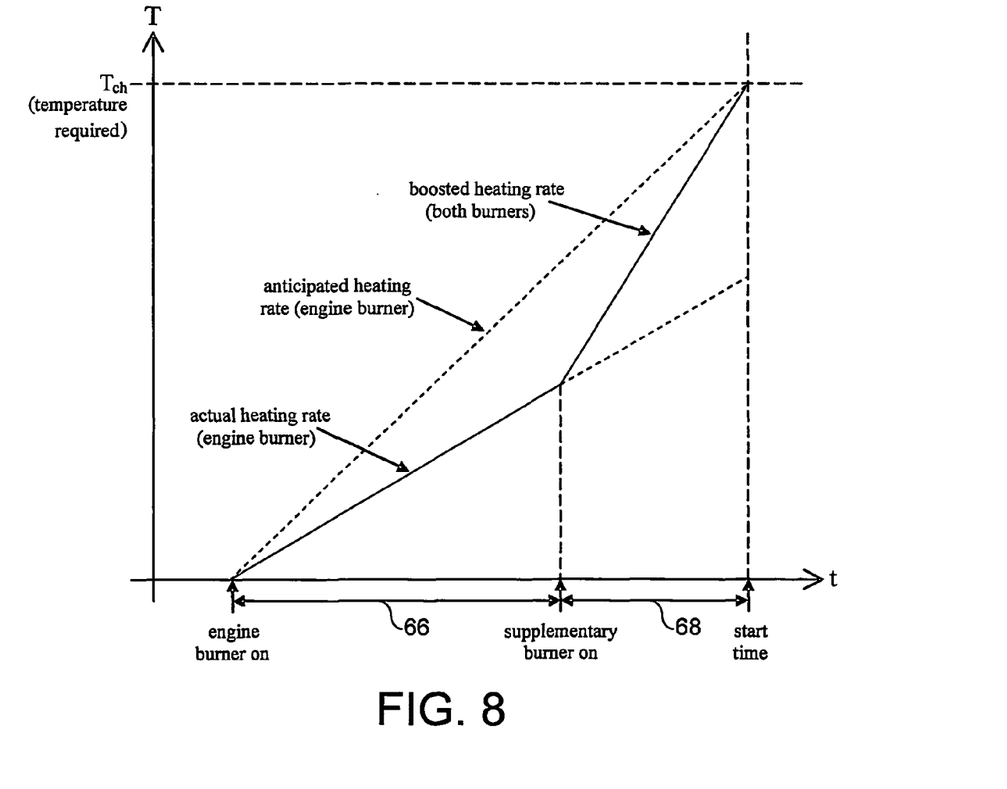
FIG. 8 is a graphical representation of the home temperature during the start-up sequence of FIG. 7.

Ideally, the engine burner 28 is used alone to provide central heating pre-heat 66, but this period of operation may be followed by a period 68 of operating both the engine burner 28 and the supplementary burner 48 at full power to bring the temperature of the home up to the set temperature in advance of the set time. As shown in FIG. 8, if the dchp controller 14 detects that the rate of room heating provided by the engine burner 28 alone is insufficient to achieve the required temperature at the specified time ($t_{CH}$), the supplementary burner 48 is turned on for the last part of the central heating pre-heat period 66. Therefore, the supplementary burner 48 is only used during pre-heat periods 64 and 66 where firing the engine burner 28 alone is insufficient to bring the home up to temperature in an acceptable time.

The short period 68, where both the engine burner 28 and supplementary burner 48 may be run at full power is scheduled to be consecutive with the central heating pre-heat period 66, so that the engine burner 28 may remain on throughout (no inefficient burner cooling between).

Hot Water Scheduling

Provision of hot water in advance of the set time is an option that may be used where there is a demand for hot water and heating at the same time and where the hot water and heating are provided independently (e.g., in non-combination heating systems) or where providing them concurrently requires more heat power than can be delivered by the engine burner 28 alone. Obviously, where hot water and central heating demands are not coincident, it is not necessary to include hot-water pre-heating at 64.

Using a hot water pre-heating period 64 allows a transfer of heating load from the supplementary burner 48 to the engine burner 28 and so increases electricity production from the dchp unit 12 and, therefore, the overall operating efficiency. As most hot-water cylinders are very well insulated, losses may be neglected when estimating the appropriate point to fire the engine burner 28 and begin the hot water pre-heat at 64. The key criterion for determining when to fire the engine burner 28 is that the hot water should reach the appropriate temperature immediately before the central heating pre-heat 66 is scheduled to begin in order to avoid on/off cycling of the engine burner 28. Clearly, the time taken to get up to a temperature depends upon the temperature of the water prior to heating and the final temperature to be met. This time is readily determined by the dchp controller 14 using temperature readings of the water in the hot-water cylinder provided by a thermistor.

Adaptive Forecasting

The dchp controller 14 is arranged to learn from the ongoing history of the dchp unit 12 to improve the accuracy in forecasting the necessary pre-heat times. The dchp controller 14 monitors the time required to achieve the required room temperature, and stores the times from the previous ten heating periods. If the supplementary burner 48 has fired during a pre-heat period 68, due to an insufficient room heating rate using only the engine burner 28, this will be reflected in an increased heating advance recorded for use in future forecasts. The length of the pre-heat periods 64 and 66 for the current heating period are calculated from these stored values (as a weighted average).

Whilst the above "economy" mode of operation is economically beneficial, there will be times when a consumer wants the temperature of the home to rise as quickly as possible. To meet this requirement, the programmer module 16 allows a consumer to switch between the economy mode and a "rapid" mode where heating and hot water are provided in as short a time as possible by firing both the engine burner 28 and the supplementary burner 48 at full power. Once the home is up to temperature, the supplementary burner 48 can be modulated whilst keeping the engine burner 28 on to maintain the set temperature.

Burner Control

In order to maintain the room temperature at its scheduled level, $T_{ch}$, a thermistor-based detector is used as opposed to one of the simple bimetallic strip designs usual in this field. This allows the rate of temperature change to be measured, as opposed to a simple on/off toggle when the set temperature is reached. The engine burner firing rate (mass flow of mixture to the engine burner 28) can be optimized to allow maximum engine operation (as is economically desirable) by adjusting the firing rate to a greater extent for higher rates of change of room temperature and to a lesser extent where the rate of change of room temperature is small. By reacting to temperature changes in this way, the supplementary burner 48 is only fired where a higher heating rate is required than can be satisfied by the engine burner 28 alone.

For the most efficient operation of the Stirling engine 26 under normal conditions, the engine head temperature should be maintained at its optimum temperature (550° C.) for as long as possible. Where the preset room temperature $T_{ch}$ has been exceeded, a reduced head temperature may be necessary that will result in a lower generating efficiency and output. This is tolerated in order to maintain the comfort of the consumer, until the room temperature has been restored to the preset level $T_{ch}$. Normal engine burner control will be resumed once this has been achieved, i.e. where an optimized heater head temperature is maintained to give the maximum generating efficiency. The following engine burner control procedure is used to ensure this condition is met during periods of normal operation.

The flow of gas through the engine burner 28 is controlled using two axes: the rate of change of the engine head temperature ($\delta T_{hh}$) and the head temperature error ($\epsilon T_{hh}$). The former value may be found simply from $$\delta T_{hh} = T_{hh,previous} - T_{hh,current}$$

where $T_{hh,previous}$ is the previous head temperature and $T_{hh,current}$ is the current head temperature. The latter value may be found simply from $$\epsilon T_{hh} = T_{hh,set} - T_{hh,current}$$

where $T_{hh,set}$ is the head set temperature. The slope of both axes is controlled by two variables than can be set using the programmer module: $R_{slope}$ and $E_{slope}$. The control output ($C_{out}$) is calculated from $$C_{out} = (\epsilon T_{hh} * E_{slope}) + (\delta T_{hh} * R_{slope})$$

This control output is converted to a percentage ($C_{out(\%)}$) of the difference between the engine burner mass flow maximum and minimum values and added to the previous mass flow output, i.e.

$$M_{out,current} = M_{out,previous} + C_{out(\%)}$$

where $M_{out,current}$ is the calculated burner mass flow rate and $M_{out,previous}$ is the previous burner mass flow rate. The new output value is range-checked to ensure it does not go beyond the minimum and maximum flow settings.

A corresponding control procedure is used for the supplementary burner 48, starting with two axes corresponding to rate of change of flow temperature and the flow temperature error.

Power Scheduling

As described above, the energy scheduler 20 receives information regarding the current price of imported electricity, the value of exported electricity and the price of imported gas from a service provider through the modem 24. This information is used to determine whether the dchp unit 12 should generate electricity or whether it is more economic simply to import electricity from the grid. In addition, the energy scheduler 20 determines the most economic time to operate domestic appliances 22 that are connected thereto. Thus, the energy scheduler 20 activates these domestic appliances 22 and monitors their operating status. This information is conveyed to the consumer on request via the programmer module 16.

Recent advances in home automation allow remote control of domestic appliances 22. For example, low cost receivers may be installed for each appliance 22 in a WiFi network or the like such that they may communicate with the energy scheduler 20 without the need for extensive hard wiring. Each domestic appliance 22 may be allocated a unique internet address, to allow communication. Such an arrangement is described in EP-A-1,217,475.

Network-Based Energy Scheduling

Our International Patent Application No. PCT/GB03/001200 describes a local co-operating network of several households that operates via a "hub" controller. In this way, electricity demands from any of the connected households in the network may be met from any of the dchp units 12 installed within the networks.

Associating an energy scheduler 20 with the hub controller allows co-ordination of operation of appliances within connected households and operation of dchp units 12 to minimise overall network energy costs. This will generally represent operating the dchp units 12 in an optimum manner to satisfy heating demands and scheduling domestic appliances 22 to smooth overall network electricity demand. In this way, costlier input of electricity from the grid may be minimised. That said, the energy scheduler 20 may source electricity from the grid where it determines it to be more economic to do so.

Variations

As will be apparent to the skilled person, variations can be made to the embodiments above without departing from the scope of the invention.

Figure 9:
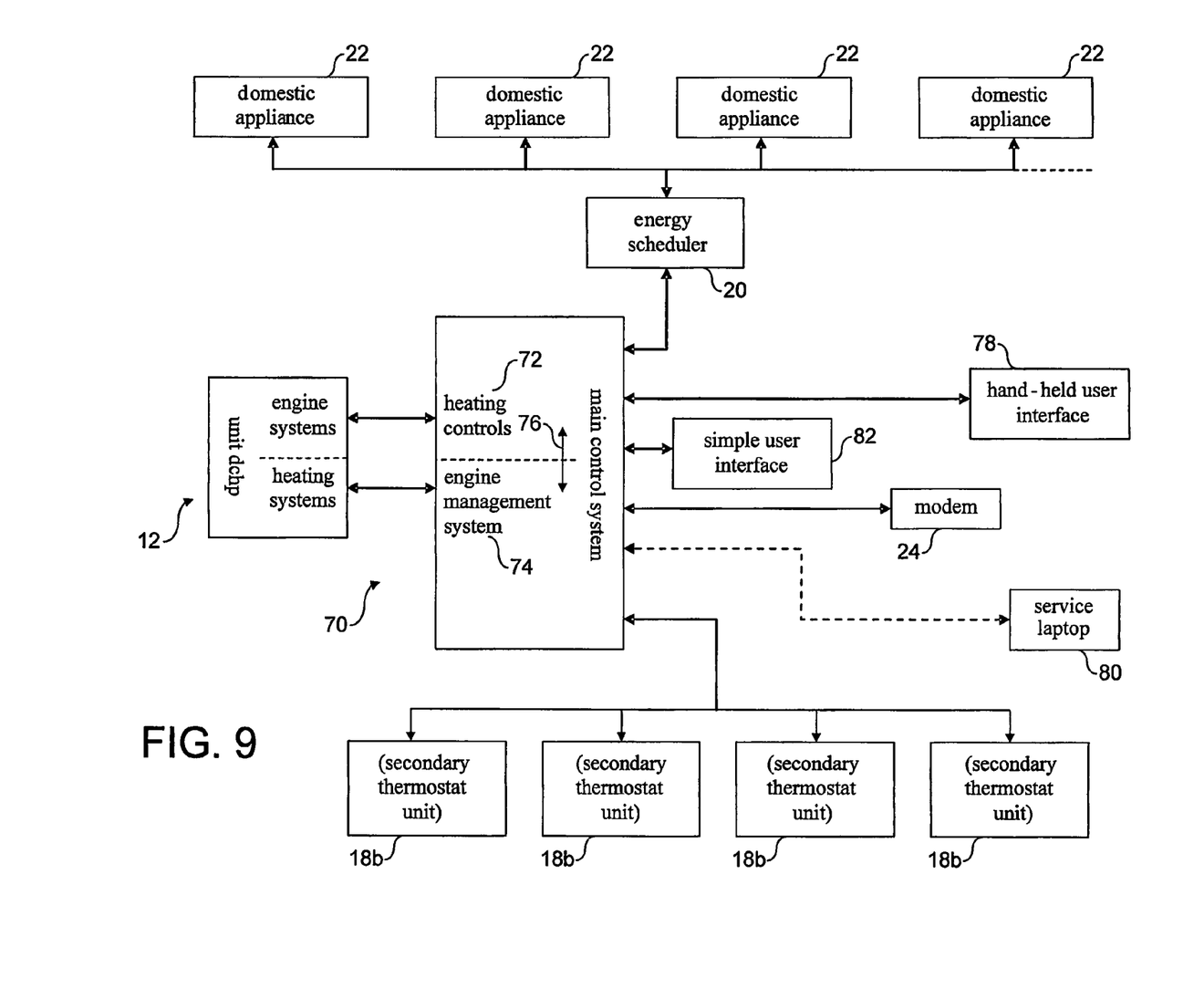
FIG. 9 shows a first arrangement for a main control system to communicate with a consumer in a domestic energy scheduling system.
Figure 10:
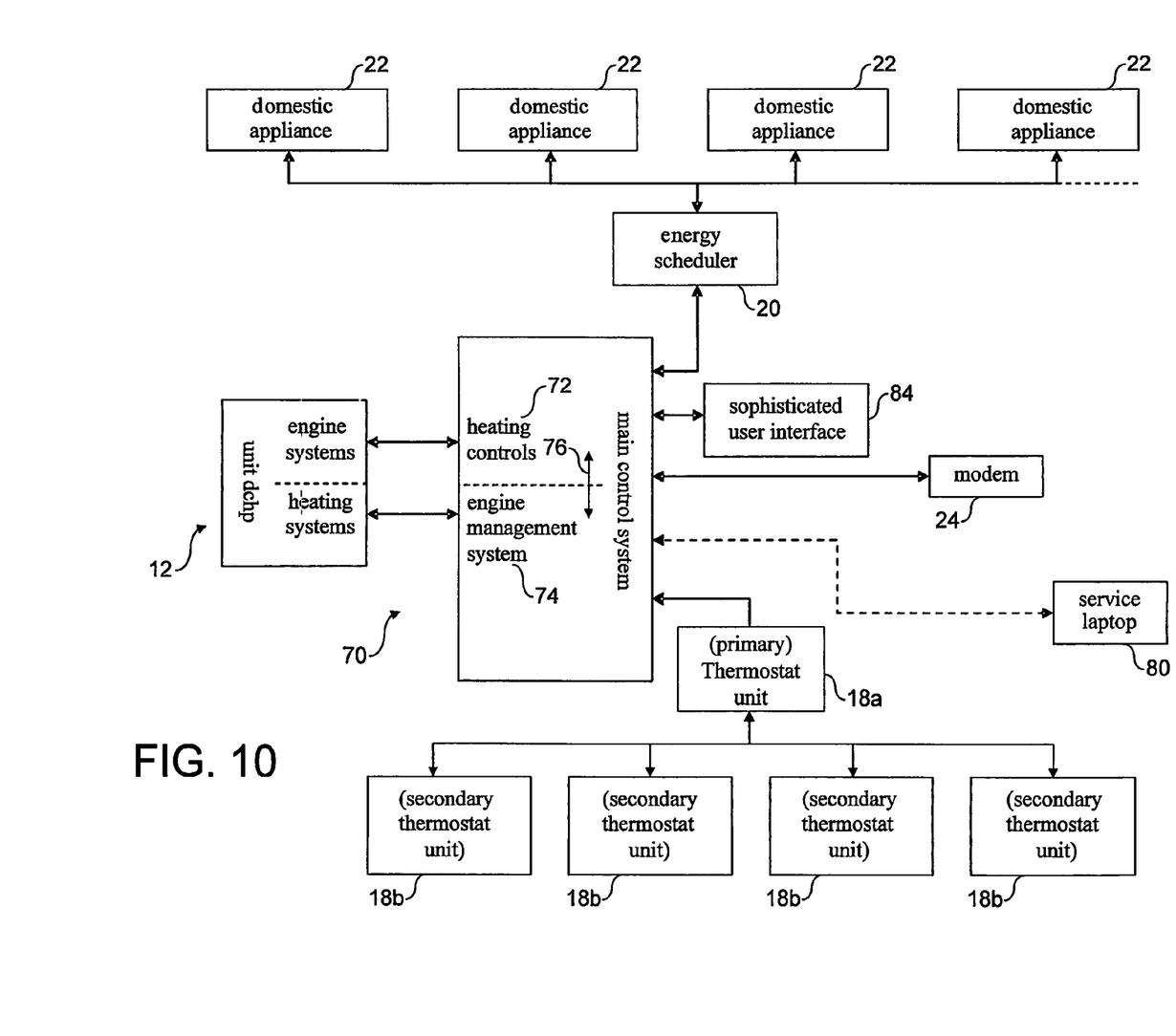
FIG. 10 shows a second arrangement for a main control system to communicate with a consumer in a domestic energy scheduling system.

For example, the above embodiment describes an arrangement where the dchp unit controller 14 and the programmer module 16 are physically separated, but able to communicate therebetween. As discussed above, this need not be the case. FIGS. 9 and 10 show two embodiments where the physically separate dchp unit controller 14 and programmer module 16 are replaced by a single main control system 70 that provides their combined functionality. Thus, the main control system 70 receives consumer inputs, derives heating and hot water schedules therefrom and also determines the operating times of the dchp unit 12.

The main control system 70 is implemented on a single control board. Two separate areas of circuitry handle the functions previously described as being performed by the dchp unit controller 14. The first area is the heating controls 72 and the second area is the engine management system 74. A data bus 76 links the two areas to provide data flow between the two areas 72 and 744.

The engine management system 74 is responsible for operating the Stirling engine 26 in the most efficient manner possible. In particular, the engine management system 74 is responsible for the following.

engine/grid connection/disconnection grid instability protection (or ENS, the German active loss of mains detection system)

grid independent functionality (GIM)

power monitoring (including engine stability checks)

engine head temperature control algorithms (feeding requirements to the heating controls 72 for heating adjustment)

safety functions

The heating controls 72 manage the heating elements of the dchp unit 12, such as the engine burner 28 and supplementary burner 48. In particular, the heating controls 72 are responsible for the following.

safety functions gas train control (fan speed, air splitter valve position, supplementary and engine gas valves, twin burner control algorithms)

heating system diagnostics (including error handling)

timekeeper (onboard clock for scheduling)

radio communications (with handheld user interface 78, thermostats 18, service equipment 80, modems 24, etc.)

The main control system 70 can communicate with a consumer in different ways and two different arrangements are shown in FIGS. 9 and 10.

FIG. 9 shows a simple controller 82 with hand-held user interface 78. This option is for installations where the dchp unit 12 is in a remote location. The simple controller, located as a panel on the casing of the dchp unit 12, allows basic on-board user settings while the normal detailed user interface is provided by a battery-operated hand-held device 78.

This will be a dumb terminal accepting the user settings and communicating this information to the main control system 70, where all of the "intelligence" is located.

The hand-held user interface 78 may optionally contain a thermostat 18, allowing the consumer the flexibility of choosing the location at which the room temperature is sampled (giving the ability to maintain the temperature in one's personal space). Thus, the hand-held user interface 78 takes the place of the primary thermostat unit 18a. The home may contain other secondary thermostat units 18b that may communicate with the main control system 70 either via radio links or via hard wiring.

FIG. 10 shows an embodiment that uses a sophisticated controller 84 rather than the simple user interface 82 and hand-held user interface 78 combination of FIG. 9. The sophisticated controller 82 arrangement is better suited to installations where the dchp unit 12 is in a central location, such as a kitchen. The sophisticated controller 82 is mounted on the casing of the dchp unit 12 and allows the full range of detailed user settings to be adjusted. Such an embodiment requires at least one additional room thermostat unit 18 (either communicating via radio links or hard wired). Other, secondary thermostat units 18b may also be installed as required.

Other features of the embodiments of FIGS. 9 and 10 differ from that of FIG. 1. In the embodiments of FIGS. 9 and 10, it is the main control system 70 that provides a communications interface with the modem 24. The main control system 70 may pass information to the energy scheduler 20 where required. Of course, the main control system 70 now provides a central interface that may pass the operating times of the Stirling engine 26 directly to the energy scheduler 20 (compared with the chain of communication of dchp unit controller 14 to programmer module 16 to energy scheduler 20 adopted in the embodiment of FIG. 1).

FIGS. 9 and 10 also show a service laptop 80 connected to the main control system 70, as may be the case during a service visit by a service engineer. Alternatively, some service functions (particularly diagnosis) may be performed remotely by connecting a service laptop 80 or other type of computer to the main control system 70 via the modem 24.

The invention claimed is:

1. A domestic heat and power system comprising a dchp unit, a dchp unit controller, a programmer module and an energy scheduler arranged to communicate with a domestic appliance, wherein:
   the dchp unit controller, the programmer module and the energy scheduler are linked to allow communication therebetween;
   the dchp unit is operable under command of the dchp unit controller to generate heat for heating a home or to provide hot water for the home and to generate electricity for supply to the home;
   the energy scheduler is operable to receive power requirement information from the domestic appliance and to cause the domestic appliance to operate;
   the programmer module is operable to receive data input by a consumer and to generate a corresponding heating or hot water schedule therefrom;
   the dchp unit controller is operable to determine operating times of the dchp unit in accordance with the heating or hot water schedule provided by the programmer module and to provide the dchp unit operating times to the energy scheduler; and
   the energy scheduler is operable to receive the dchp unit operating times and to determine operating times of the domestic appliance using the dchp unit operating times.

2. A domestic heat and power system according to claim 1, further comprising a connection to an electrical grid operable to supply electricity generated by the dchp unit to the grid.

3. A domestic heat and power system according to claim 1, wherein the programmer module is operable to display information relating to the domestic heat and power system.

4. A domestic heat and power system according to claim 1, further comprising communication means operable to exchange information with one or more remote locations.

5. A heat and power system according to claim 4, wherein the communication means comprises a modem operable to communicate via a telephone network.

6. A heat and power system according to claim 4, wherein the programmer module is operable to receive information from service or product providers via the communication means.

7. A heat and power system according to claim 4, wherein the programmer module is operable to send information about the heat and power system to a maintenance agent via the communication means.

8. A domestic heat and power system according to claim 1, further comprising a first thermostat unit linked to allow communication to the programmer module.

9. A domestic heat and power system according to claim 8, wherein the first thermostat unit is operable to measure the temperature and to display the temperature so measured, and further comprises adjustment means operable to allow a consumer to set a desired temperature of the home.

10. A domestic heat and power system according to claim 9, further comprising one or more secondary thermostat units in communication with the first thermostat unit.

11. A domestic heat and power system according to claim 10, wherein only the first thermostat unit is operable to measure the temperature and all thermostat units are operable to display the temperature so measured and further comprise adjustment means to allow the consumer to set a temperature of the home.

12. A domestic heat and power system according to claim 1, wherein the dchp unit controller has a first part operable to control an engine of the dchp unit and has a second part operable to control one or more heating elements of the dchp unit.

13. A domestic heat and power system according to claim 1, further comprising a handheld device operable to receive data input by a consumer and to convey such information to the programmer module.

14. A domestic heat and power system according to claim 13, wherein the handheld device includes a thermostat.

15. A domestic heat and power system according to claim 1, wherein the programmer module is operable to receive data input by a consumer corresponding to time bands having start and end times, a desired temperature for the home during that time band or confirmation that hot water is required during that time band, and the programmer module is operable to generate a corresponding heating or hot water schedule therefrom; and
   the dchp unit controller is operable to determine operating times of the dchp unit in accordance with the heating or hot water schedule provided by the programmer module such that the temperature of the home reaches the desired temperature or hot water is available at the start time of each time band.

16. A domestic heat and power system according to claim 15 the dchp unit further comprising a main burner and a supplementary burner, wherein operation of the main burner generates electricity and wherein the dchp unit controller determines the dchp unit operating times according to a rule that firing of the supplementary burner should be minimised.

17. A domestic heat and power system according to claim 16, wherein the dchp unit controller is operable to determine the dchp unit operating times such that there is a period where the main burner is fired alone prior to the start time of a time band for which an elevated desired temperature has been set.

18. A domestic heat and power system according to claim 17, wherein the dchp unit controller is operable to receive information indicative of the temperature of the home and to predict whether the home will reach the desired temperature in time for the start of the time band and, where the prediction is in the negative, is operable to cause the supplementary burner to fire thereby ensuring that the home does reach the desired temperature in time for the start of the time band.

19. A domestic heat and power system according to claim 18, wherein the dchp unit controller is operable to record the time taken to reach the desired temperature of a time band for a plurality of previous days and to determine the length of the period during which the main burner alone is to be fired using these times.

20. A domestic heat and power system according to claim 19, wherein the dchp unit controller is operable to increase automatically the length of a subsequent period during which the main burner alone fired if the supplementary burner is fired to ensure the home reaches a desired temperature in advance of the start of the time band.

21. A domestic heat and power system according to claim 16, wherein when both heating and hot water are required in advance of the start time of a time band, the dchp unit controller determines the dchp unit operating times according to a rule that the dchp unit operates for a first period to provide hot water immediately before a second period where the dchp unit operates to provide heating.

22. A domestic heat and power system according to claim 16, wherein the dchp unit controller is operable to determine the dchp unit operating times such that the main burner remains firing between periods.

23. A domestic heat and power system according to claim 16, wherein heating or hot water is maintained during a time band by the dchp unit under the command of the dchp unit controller, whereby the dchp controller is operable to determine operation of the dchp unit according to rule that the supplementary burner is switched between firing and idling in preference to switching the main burner between firing and idling.

24. A domestic heat and power system according to claim 23, wherein the temperature of the main burner head is monitored.

25. A domestic heat and power system according to claim 24, wherein the dchp unit controller is arranged to switch the mains burner to idle if a main burner head temperature above an upper limit is measured.

26. A domestic heat and power system according to claim 25, wherein the dchp unit controller is arranged to reduce the temperature of the main burner head without setting the engine burner to idle when a main burner head temperature above a lower limit but below the upper limit is measured.

27. A domestic heat and power system according to claim 16, wherein the dchp controller is operable to control the firing rate of the supplementary burner or the main burner using a measure of the rate of change of the home temperature.

28. A domestic heat and power system according to claim 27, further comprising a thermistor-based thermometer operable to supply to the dchp unit controller the measure of the rate of change of the home temperature.

29. A domestic heat and power system according to claim 28, wherein the temperature of the main burner head is monitored.

30. A domestic heat and power system according to claim 28, wherein the dchp unit controller is arranged to switch the mains burner to idle if a main burner head temperature above an upper limit is measured.

31. A domestic heat and power system according to claim 30, wherein the dchp unit controller is arranged to reduce the temperature of the main burner head without setting the engine burner to idle when a main burner head temperature above a lower limit but below the upper limit is measured.

32. A domestic heat and power system according to claim 15, wherein the programmer module is operable to receive data input by a consumer corresponding to at least two sets of time bands having start and end times, a desired temperature for the home during that time band or confirmation that hot water is required during that time band, each time band spanning a twenty four hour period and the consumer indicating which set is to be used for each day of the week and wherein the dchp unit controller implements the appropriate set on each day.

33. A domestic heat and power system, serving a network of homes, comprising:
  a hub controller;
  electricity transmission means connecting the network of homes;
  communication means allowing communication between the network of homes and the hub controller;
  at least one home provided with a dchp unit, a dchp unit controller and a programmer module wherein the dchp unit controller, the programmer module and the hub controller are linked to allow communication therebetween, the dchp unit is operable under command of the dchp unit controller to generate heat for heating that home or to provide hot water to that home and to generate electricity for use in that home and for supply into the network of homes via the electricity transmission means, the programmer module is operable to receive data input by a consumer and to generate a corresponding heating or hot water schedule therefrom, and the dchp unit controller is operable to determine operating times of the dchp unit in accordance with the heating and/or hot water schedule provided by the programmer module and to provide the dchp unit operating times to the hub controller; and
  at least one other home provided with a local energy scheduler arranged to communicate with the hub controller and a domestic appliance in that home and being operable to receive power requirement information from the domestic appliance and to pass the information to the hub controller, wherein the hub controller is operable to determine operating times of the domestic appliance using the dchp unit operating times and to pass the domestic appliance operating times to the local energy scheduler that, in turn, causes the domestic appliance to operate in accordance with that schedule.

* * * * *